Figure 1:
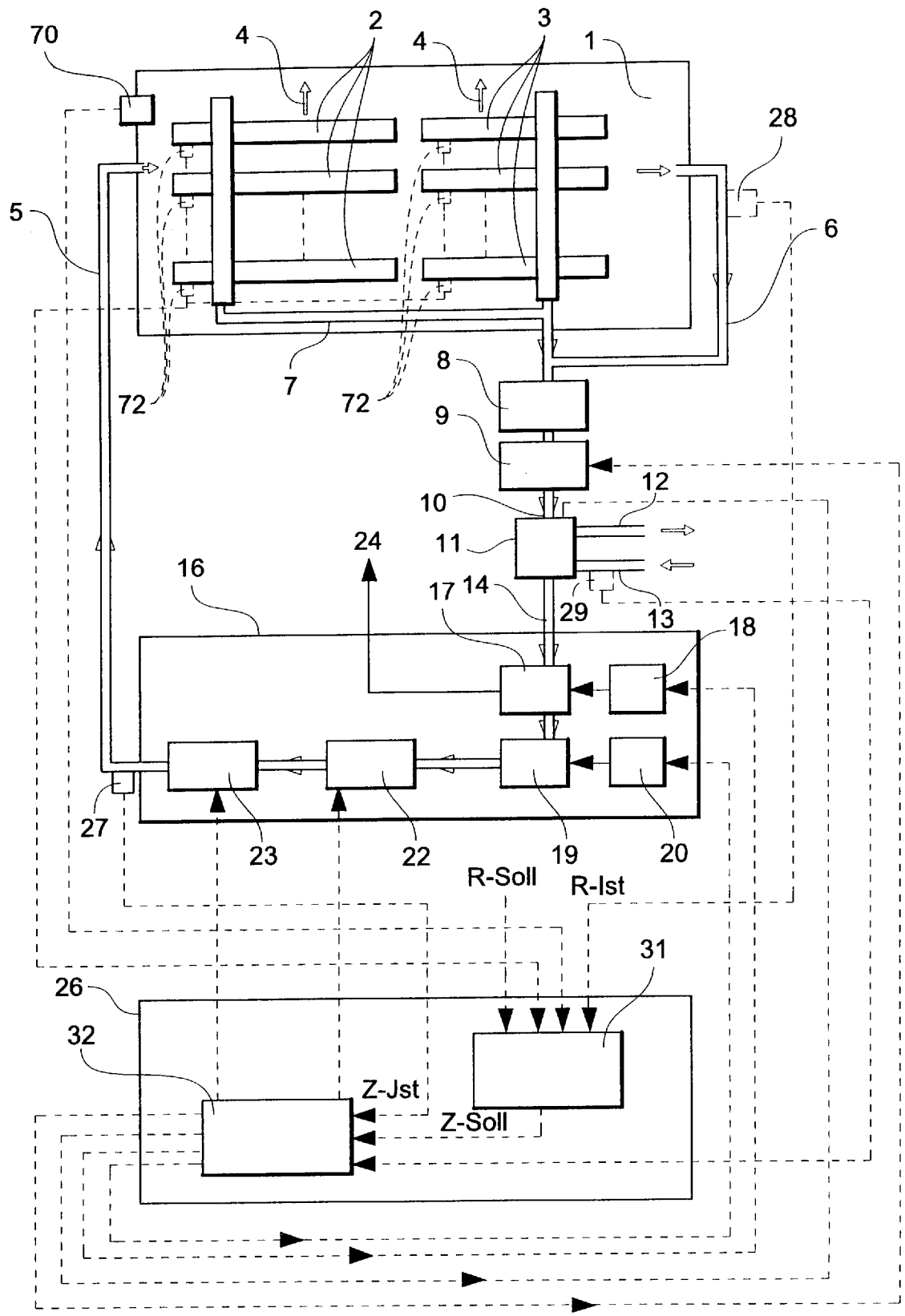

United States Patent
Meyer

[11] Patent Number: 5,931,376
[45] Date of Patent: Aug. 3, 1999

[54] DEVICE FOR AIR-CONDITIONING CONTROL IN AN AIR-CONDITIONED ROOM HAVING TEXTILE MACHINES

[75] Inventor: Urs Meyer, Niederglatt, Switzerland

[73] Assignee: Luwa AG, Zurich, Switzerland

[21] Appl. No.: 08/836,645

[22] PCT Filed: Oct. 30, 1995

[86] PCT No.: PCT/CH95/00252

§ 371 Date: May 6, 1997

§ 102(e) Date: May 6, 1997

[87] PCT Pub. No.: WO96/14542

PCT Pub. Date: May 17, 1996

[30] Foreign Application Priority Data

Nov. 7, 1994 [CH] Switzerland .............. 3312/94

[51] Int. Cl.⁶ .................................. F24F 00/00
[52] U.S. Cl. .................. 236/44 C; 236/49.3; 236/91 C; 236/91 F; 165/251
[58] Field of Search .................. 236/44 R, 44 C, 236/44 A, 49.3, 91 R, 91 F, 91 C, 78 D; 165/249, 251

[56] References Cited

U.S. PATENT DOCUMENTS

| | | |
|---|---|---|
| 3,777,806 | 12/1973 | Tailor . |
| 3,946,297 | 3/1976 | Bechtel .............. 236/78 D X |
| 3,979,922 | 9/1976 | Shavit ................ 165/251 X |
| 4,259,722 | 3/1981 | Iwata et al. .......... 165/42 X |
| 4,347,712 | 9/1982 | Benton et al. ........ 165/251 X |
| 4,645,908 | 2/1987 | Jones ................. 165/240 X |
| 4,836,096 | 6/1989 | Avery ................. 165/249 X |
| 4,841,733 | 6/1989 | Dussault et al. ...... 165/249 X |
| 5,209,398 | 5/1993 | Drees ................. 236/91 F |
| 5,410,890 | 5/1995 | Arima ................ 236/78 D X |

FOREIGN PATENT DOCUMENTS

| | | |
|---|---|---|
| 0455509 A1 | 11/1991 | European Pat. Off. . |
| 0518322 A2 | 12/1992 | European Pat. Off. . |
| WO 89/12269 | 12/1989 | WIPO . |

*Primary Examiner*—Harry B. Tanner
*Attorney, Agent, or Firm*—Adams Law Firm, P.A.

[57] ABSTRACT

The description relates to a device for air conditioning control in an air-conditioned room containing textile machines, especially circular spinning and spooling machines, with an air feed and an air discharge duct connecting the air-conditioned room to the air conditioning unit. A first set of sensors for measuring the temperature and relative humidity of the air in the room is connected for the control purposes to a first regulating circuit, and a second set of sensors for measuring the temperature and relative humidity of the feed air is connected for control purposes to a second regulating circuit. The first and second regulating circuits are connected in cascade, the first regulating circuit supplying a reference value to the second regulating circuit which controls the adjusting components of the air conditioning unit.

29 Claims, 4 Drawing Sheets

DEVICE FOR AIR-CONDITIONING CONTROL IN AN AIR-CONDITIONED ROOM HAVING TEXTILE MACHINES

This application is a national stage application, according to Chapter II of the Patent Cooperation Treaty. This application claims the priority date of Nov. 7, 1994, for Swiss Patent Application No. 03 312/94-3.

The invention relates to a device for air-conditioning control in an air-conditioned room having textile machines in a textile operation.

In spinning operations, air conditioning systems for controlling the temperature and the relative humidity in the spinning room, which is equipped with various textile machines, is an absolute precondition for normal production operation. During the processing of fibers to form yarn, a relative humidity is to be maintained in a narrow band width range of 40% rH to 50% rH, whereas the processing of yarns to form fabrics and knitted products requires a rather higher air humidity of 60% rH to 80% rH. However, condensation must never occur, and on the other hand the air humidity is also not to fall below 30% rH, even for a brief period. Since as is known the relative humidity and the temperature are related to each other according to the so-called Mollier diagram, it is moreover necessary for the temperature of the air in the room likewise to be controlled within a narrow band width by the air conditioning system. The highest requirements on the air conditioning are placed by the combination of modern ring spinning machines and spooling machines. The two machines are set up directly alongside each other in the spinning room, but require different air conditioning. The ring spinning machine is particularly sensitive to the relative humidity of the air: an air humidity of more than 50% rH leads to the formation of fiber laps on the drafting mechanism cylinders and top rollers of the drafting mechanism. On the other hand, too dry an environment promotes the formation of fiber lint, which can cause disturbances at various locations on the ring spinning machine. For its part, the spooling machine prefers a compliant yarn with a low tendency to snarling, and hence a rather moist climate. In the case of this machine, it is a case of preventing the shifting of fibers along the filament and production of filament loops and snarls, which can lead to disturbances in the spooling machine.

The combination of ring spinning machine and spooling machine also places high requirements on the air conditioning in relation to the loading on the air. The ring spinning machine, with its open spinning points, continuously emits fibers to the environment. In order to protect the health of the operating personnel, the ambient air must therefore be exchanged frequently. In addition, both machines dissipate a considerable power loss to the environment, with the result that the air in the spinning room must be fundamentally cooled by the air conditioning system, be it by means of moistening or additionally by means of cooling units.

With the introduction of high-capacity ring spinning machines, which have over 1000 spindles and spindle speeds of 20,000 revolutions/minute and more, more than 25 air changes per hour are necessary under the conditions mentioned. The existing air conditioning systems are as a result loaded to their limits. Investigations have in particular shown, for example in the dissertation "Energiesparmassnahmen in einer vollinformatisierten Baumwollspinnerei" [Energy-saving measures in a fully automated cotton spinning mill], published at the beginning of 1994 by Rolf Friedrich Bergrath at the Technical University of Zurich (Diss.ETH-No. 10657), that the control loops are only capable of following rapid changes in the air circuits to an unsatisfactory extent. This leads to uncontrollable oscillations and swings in the temperature and the relative humidity of the air in the room, which within minutes can cause a large number of thread breakages or laps on the spinning machines, so that under certain circumstances the latter even have to be switched off.

The present invention is therefore based on the object of offering a device for air-conditioning control in an air-conditioned room having textile machines, in particular ring spinning and spooling machines, which device ensures stable and accurate control of the temperature and of the relative humidity of the air in the room under all operating conditions.

The invention has the great advantage that, in a manner which is intrinsically and individually simple, but very effective, a stable and sufficiently precise control of the temperature and of the relative humidity in the air-conditioned room is achieved. The solution according to the invention may therefore readily be used in existing air conditioning systems, so that replacement by a new air conditioning system is not necessary. Furthermore, the device according to the invention allows the necessary power to be treated very economically, since the throughputs of air can be reduced to the absolutely necessary minimum.

Figure 2:
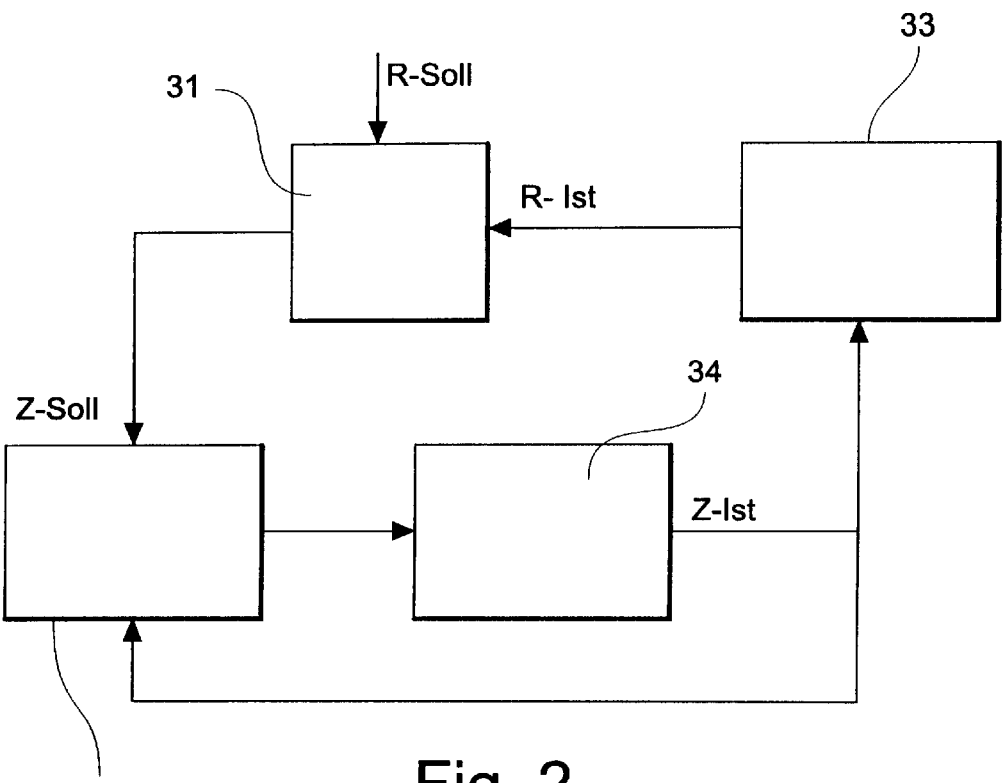
Figure 3:
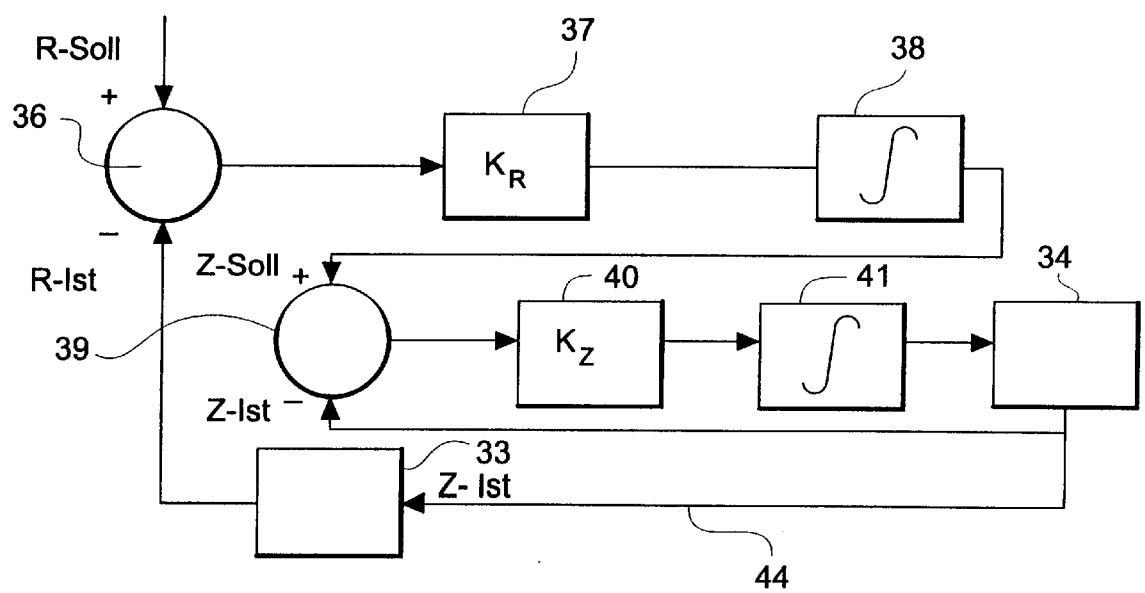
Figure 4:
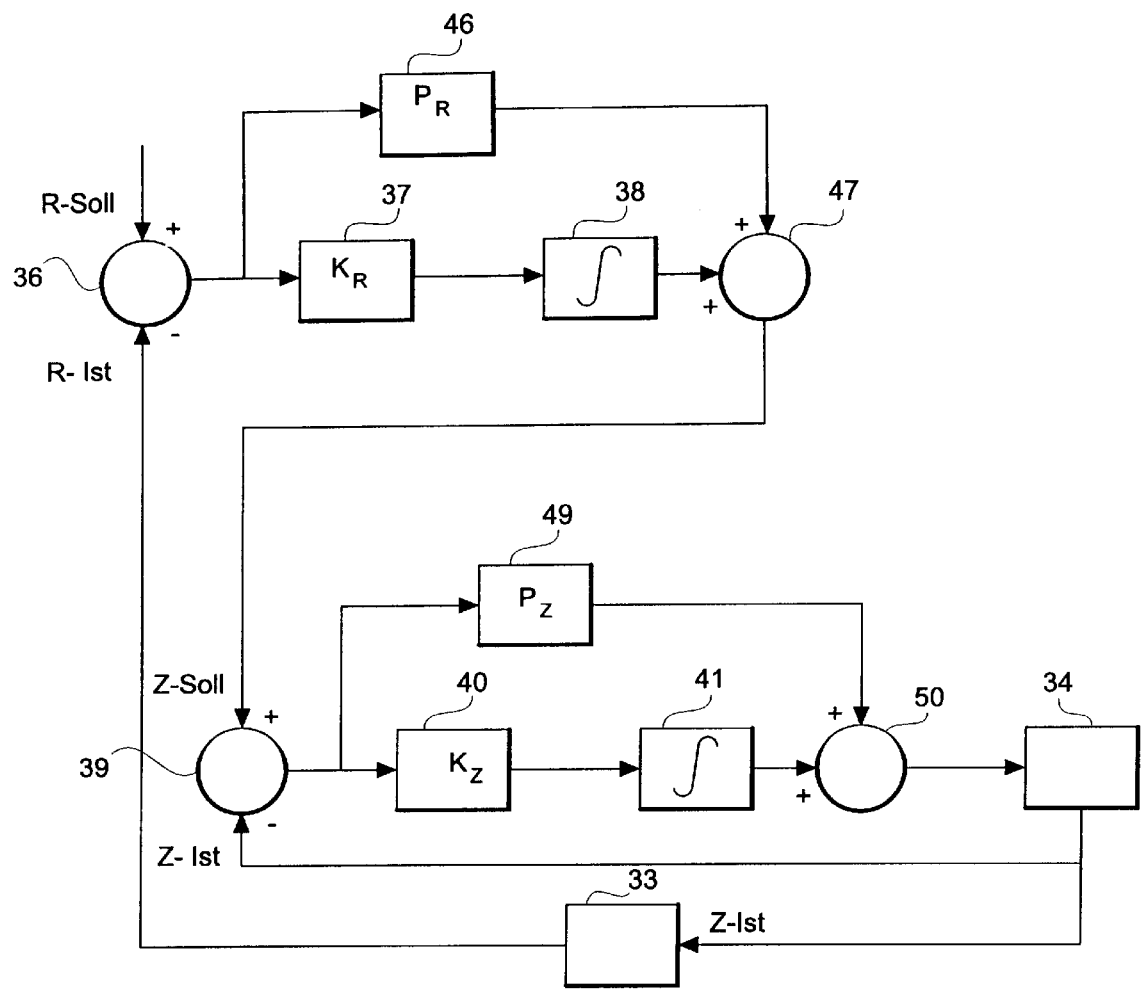
Figure 5:
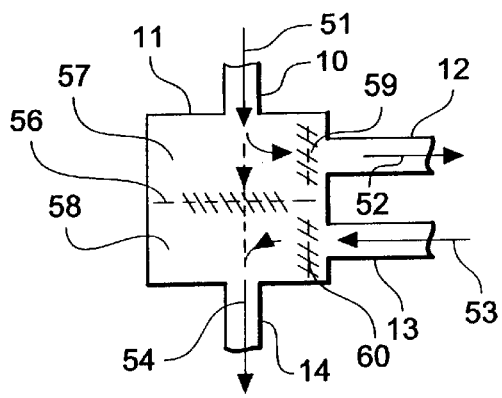

Further advantages of the invention follow from the dependent claims and from the following description. There, the invention is explained in more detail using the examples illustrated in the schematic drawings, in which:

FIG. 1 shows a schematic illustration of the air conditioning system for an air-conditioned room of a textile operation, FIG. 2 shows a basic illustration to illustrate the control concept of the air conditioning system, FIG. 3 shows a block diagram of a first embodiment of the air-conditioning control, FIG. 4 shows a block diagram of a second embodiment of the air-conditioning control, FIG. 5 shows a detailed illustration of the mixing unit, and FIGS. 6a–6d show examples of fuzzy sets for controlling the air conditioning system.

In the figures, in each case the identical reference symbols are used for the same elements, so that first-time explanations relating to these elements apply to all the figures.

FIG. 1 shows the basic structure of the air-conditioning control according to the invention in an air-conditioned room 1 having a plurality of ring spinning machines 2 in combination with spooling machines 3. The waste heat which is radiated into the room 1 as a result of the power loss of the spinning and spooling machines 2 and 3 is indicated with arrows 4. The air-conditioned room 1 is supplied with freshly air-conditioned supply air via an air supply duct 5, and discharge air contaminated with lint and dust is removed on the one hand via an air discharge duct 6 and on the other hand via a machine air discharge duct 7, which is connected to suction units and migratory cleaners, which are not shown further here. The air discharge duct 6 and the machine air discharge duct 7 are led together via a filter unit 8, comprising an upstream and a downstream filter, and a subsequent blower 9, and are connected via a connecting duct 10 to a mixing unit 11, which is constructed as a recirculation air valve and is motor-adjustable (for closer details, cf. FIG. 5). The mixing unit 11 has a blow-out duct 12 and an external air duct 13, with which on the one hand the contaminated discharge air and water vapor can be removed from the circulation and on the other hand fresh external air can be sucked in. The mixing unit 11 is then connected via a mixed air duct 14 to an air conditioning system 16. The air conditioning system 16 has a cooling unit 17 with an adjustable valve 18, an air scrubber 19 with a variable-speed pump 20, a heater 22 and a blower 23, which are connected to one another in the sequence listed. The various connecting ducts between these elements are identified using double lines and arrows. The waste heat dissipated by the cooling unit 17 is indicated by an arrow 24. The blower 23 is connected to the air supply duct 5 as the last element of the air conditioning system 16. The signal connections between a process computer 26 and sensors 27 on the air supply duct 5 and sensors 28 on the air discharge duct 6 are indicated by dashed lines. The electrical control lines to the blower 8, and to the mixing unit 11 and to the control elements of the air conditioning system 16 are identified by dashed lines. Likewise indicated by dashed lines is the fact that sensors 29 can be provided on the external air duct 13. The sensors 27, 28 and 29 serve for measuring the temperature and the relative humidity. At least the temperature sensor for the supply air has a semiconductor resistor (also called an NTC resistor) or a resistance wire (made of so-called Pt100) of low mass, and thus has a rapid reaction time of a few seconds. Moisture sensors of the capacitive or resistive type have a sufficiently small. time constant in order to be able to register rapid changes in the supply air, for which reason these are preferred here. A very rapid reaction time is not absolutely necessary for the sensors 28 in the air discharge duct 6, so that slower sensors can logically be employed there. The process computer 26 essentially has a first control loop 31, designated as room air controller, and a second control loop 32, designated as supply air controller, whose function will be described in more detail with reference to FIGS. 2 to 4.

The control concept of the air conditioning system 16 will now be presented in more detail in conjunction with FIG. 2. The room air controller 31 is connected on the one hand to the supply air controller 32 and on the other hand to a first controlled system 33 for the air-conditioned room 1. The supply air controller 32 is moreover connected to a second controlled system 34 for the air conditioning system 16 and to the first controlled system 33. The room air controller 31, the supply air controller 32, the first and the second controlled systems 33 and 34 can be operated in a known way, pneumatically, hydraulically or else electrically. Using the desired values of the air in the room, indicated by the arrow R-Soll, and the measured values of the temperature and of the relative humidity of the air in the room, indicated by the arrow R-Ist, the room air controller 31 determines the set points Z-Soll for the temperature and the relative humidity of the supply air. These set points Z-Soll, together with the measured values Z-Ist of the temperature and of the relative S humidity of the supply air and, if appropriate, with the measured values of the temperature and of the relative humidity of the external air, are applied to the supply air controller 32. From these values Z-Soll and Z-Ist, the supply air controller 32 determines the values to be set for the controlled variables of the air conditioning system 16, which act on the various influence factors such as cooling unit 17, air scrubber 19, heater 22 and blower 23. These define, together with the sensors 27 on the air supply duct 5 and if appropriate with the sensors 29 on the external air duct 13 (cf. FIG. 1), the controlled system 34 of the air conditioning system 16. As a result of this control, a stable state of the supply air is quickly established, said air being introduced into the air-conditioned room 1 and mixing there with the room air which is present. The result of this mixing is a new state of the air in the room, as regards temperature and relative humidity, which are registered by the sensors 28. From this, the room air controller 31 then determines in the manner explained above the new set points Z-Soll of the temperature and of the relative humidity for the supply air. In this cascade control, the supply air controller 32 ensures the stability and the room air controller 31 the accuracy of the values to be set.

A concrete design for the cascade control described above is now specified in FIG. 3. The physical relationship of relative humidity and temperature is of little advantage in terms of control technology, since they mutually influence each other. Given a constant absolute water content of the air, in the case of a temperature change the relative humidity is also changed, and vice versa. If, for example, the relative humidity of the supply air is to be increased and the temperature to be kept the same, then the control elements of the pump 20 of the air scrubber 19 and those of the valve 18 of the cooling unit 17 have to be controlled simultaneously. If more water is sprayed in by increasing the pump rotational speed, then the relative humidity increases, and the temperature of the moistened air falls because of the heat of evaporation extracted from it. Consequently, the valve 18 must in turn be closed more in order to balance out this temperature difference. For this reason, two separate cascade controllers are provided for the temperature and the relative humidity, both being constructed identically and therefore able to be explained using a single FIG. 3. The control will now be presented in relation to the temperature of the supply air, but is consequently designed identically for the control of the relative humidity. In a difference element 36, the difference is formed between the desired value R-Soll of the room air temperature and the actual value R-Ist of the room air temperature, which signal is forwarded to an amplifier 37 having the gain factor $K_R$ for the room air. From this, a time integral is formed in an integral element 38, and this signal is fed to a difference element 39 as the set point Z-Soll for the supply air temperature. Here, a difference is formed from the set point Z-Soll and the actual value Z-Ist, which signal is forwarded to an amplifier 40 with the gain factor $K_Z$. This signal is connected via an integral element 41 to the above-described controlled system 34 of the air conditioning system 16, in which the current actual value Z-Ist, that is to say the current temperature of the supply air, is formed and measured. The supply air which is introduced into the air-conditioned room 1 influences the room air temperature, which is indicated using a signal line 44 and the controlled system 33 of the air-conditioned room. There, the new actual value R-Ist of the room air temperature is measured in the manner described above. Cascade control for the relative humidity is also provided in precisely the same way.

The first cascade controller then controls the relative humidity via the pump 20 of the air scrubber 19 (FIG. 1). At each correction of the relative humidity, a change to the temperature takes place simultaneously, which is not desired under certain circumstances. The second cascade controller for the temperature then controls the temperature via the valve 18 of the cooling unit 17. At each control of the temperature, a change also takes place in the relative humidity. If, then, both cascade controllers run simultaneously, each cascade controller corrects its own controlled variable with the disturbances which are caused to its controlled variable by the other cascade controller. This results in the variables of the supply air to be controlled levelling out, with the result that the temperature and the relative humidity of the room air in the air-conditioned room 1 are kept constant at a very stable value.

In the case of the control previously described, the values of the supply air oscillate with a very low amplitude about a base value, which is a consequence of the integral elements of the cascade controllers interacting with the sensors. In order to improve this, the above circuit can be supplemented, as shown in FIG. 4, using proportional elements. A proportional element 46 having the proportional coefficient PR is connected via a summing element 47 in between the difference element 36 and the difference element 39, parallel to the amplifier 37 and integral element 38. Similarly, a proportional element 49 having the proportional coefficient PZ and a summing element 50 is connected in parallel with the amplifier 40 and integral element 41. The cascade controller equipped in this way reacts more rapidly, so that when the spinning and spooling machines 2 and 3 are started up, the relative humidity of the air in the room reaches the prescribed desired value as rapidly as possible. As a result, thread breaks in the starting phase and also during doffing are prevented to the greatest possible extent. The oscillations of the temperature and of the relative humidity of the supply air, which can still occur in the case of the cascade control described in FIG. 3, no longer occur in the case of this cascade control.

The cascade controllers described in FIGS. 3 and 4 are suitable both for an air conditioning system in pure recirculation operation, that is to say in which no fresh air is added from outside the air-conditioned room 1, and with the exchange of discharge air laden with water vapor and freshly supplied external air. The mixing unit or recirculation air valve 11 is shown in more detail in FIG. 5 in order to explain this principle. As can be seen there, the discharge air 51 is introduced via the connecting duct 10 into the mixing unit or recirculation air valve 11. The mixing unit 11 is divided into two chambers 57 and 58 by a motor-adjustable series of louvers 56 lying alongside one another. The connecting duct 10 and the blow-out duct 12 are thus connected to the first chamber 57, and the external air duct 13 and the mixed air duct 14 are connected to the second chamber 58. Inside the mixing unit 11, rows of louvers 59 and 60, likewise motor-adjustable, are provided upstream of the blow-out duct 12 and upstream of the external air duct 13. The air conditioning system 16 can thus be operated exclusively with recirculated air (louvers 56 completely open; louvers 59 and 60 completely closed), or all the discharge air 51 is expelled as blow-out air 52 and is exchanged for fresh external air 53 (louvers 56 completely closed, louvers 59 and 60 completely open). Between these two end positions, by means of suitable setting of the opening angle of the louvers 56, 59 and 60, the discharge air 51 can be mixed with fresh external air 53 in a predetermined ratio and fed as mixed air 54 to the air conditioning system via the mixed air duct 14.

The mode of operation of the air conditioning controller which is operated in this manner and is shown in FIG. 1 in conjunction with FIG. 5 is now as follows:

If the waste heat 4 from the spinning machines 2 and the spooling machines 3 is not sufficient to heat up the supply air to the correct temperature, the heater 22 must be switched on. This is true, for example, for spinning mills in relatively cold areas, such as in northern Europe. In this case, the recirculation air valve 11 is switched to recirculated air, that is to say no fresh external air 53 is supplied via the external air duct 13. The recirculation air valve 11 is however, switched into another position when the temperature of the supply air is intended to be cooled by means of the supply of external air, which may apply to spinning mills in relatively warm areas. In this case, the discharge air 51 is mixed with the fresh external air 53, so that the supply air is automatically cooled. This takes place under the precondition that the external air 53 is cooler than the discharge air 51. Only if this type of cooling is not sufficient, that is to say if the louvers 56, 59 and 60 of the recirculation air valve 11 are in their end position, that is to say when complete exchange of discharge air 51 for fresh external air 53 is taking place, is the control element of the valve 18 of the cooling unit 17 driven. In this way, it is intended to control not only the temperature of the supply air but also the relative humidity.

It goes without saying that the prescriptions on the air conditioning system 16 are not always unique, because of the requirements indicated above, and can even mutually oppose one another. In order nevertheless to achieve sensible control, control using so-called "fuzzy logic" is suggested, the fundamentals of which are extensively presented in the text book "Fuzzy-Logik" by Prof. Dr. Gert Böhme in the Springer-Verlag (1993). In this case, in order to make a decision, specific fuzzy sets are used which permit less precise statements to be converted into stable control of the manipulated variables.

Figure 6A:
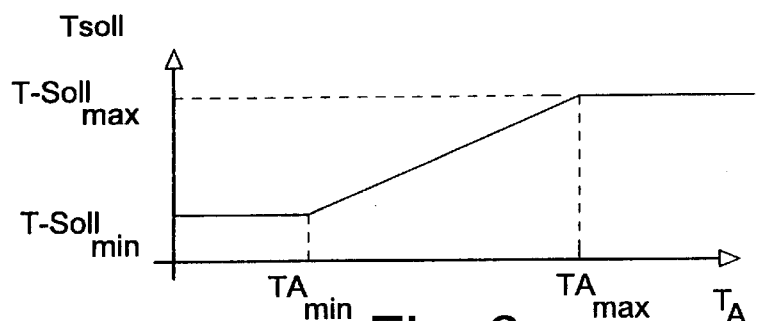
Figure 6B:
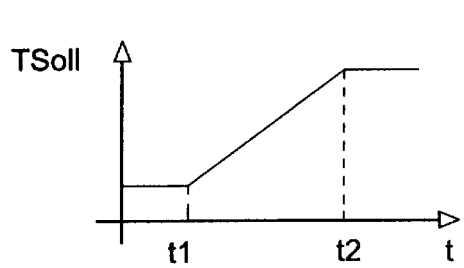
Figure 6D:
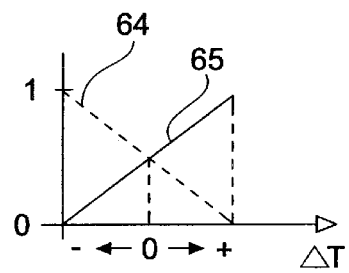

The use of fuzzy logic for the control described above is now illustrated in part using FIGS. 6a–6d. Shown in FIG. 6a is a fuzzy set for the set point of the temperature T-Soll as a function of the external temperature $T_A$. The set point T-Soll must not fall below a specific minimum value T-Soll$_{min}$, which is reached at an external temperature $T_{Amin}$. Likewise, set point T-Soll must not go beyond a specific maximum value T-Soll$_{max}$, which is reached at an external temperature $T_{Amax}$. Between these two values, the set point T-Soll changes linearly with the external temperature $T_A$. This means that the control of the set point T-Soll in this range follows the external temperature $T_A$. Below the minimum value T-Soll$_{min}$, the temperature can additionally be maintained by means of the heater 22, and above the maximum value T-Soll$_{max}$ by means of the cooling unit 17. In order that the adaptation of the set point T-Soll is not carried out directly following each change of the external temperature $T_A$, a time limitation is provided in accordance with the curve of FIG. 6b, which provides for a slow setting of the set point in which the set point, beginning from a time $t_1$, is reached after a time period $t_2$–$t_1$. Using such control, a sliding temperature setting is possible, which results in optimum utilization of the cooling or heating of the supply air by means of fresh external air. This avoids rapid temperature changes, which cannot be transmitted to the machines with their thermal inertia, which for the first time makes an economical sliding management of temperature possible. The setting of the above-mentioned desired curve is carried out by the spinning mill manager, who can thus employ his relevant experience in a targeted manner in the control of the air conditioning system 16.

Figure 6C:
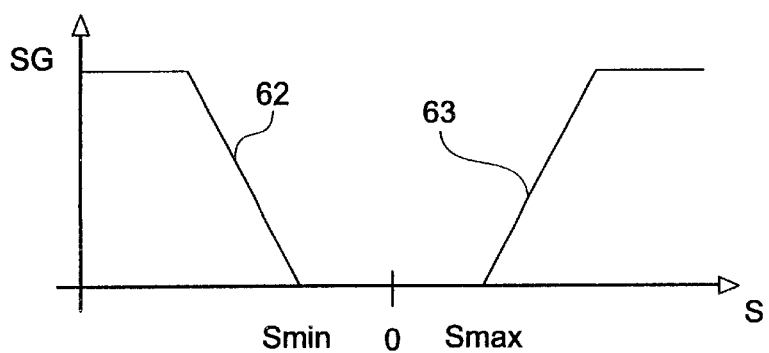

The fuzzy set for setting the control elements SG of the cooling unit 17 and of the heater 22 as a function of a manipulated variable S, given by the actual value of the temperature T-Ist and the set point T-Soll, is now shown in FIG. 6c. If this manipulated variable S falls below a specific value $S_{min}$, the heater 22 is gradually switched on in accordance with the curve 62. Conversely, if the manipulated variable S goes above a specific value $S_{max}$, the cooling unit 17 is switched on in accordance with the curve 63. Within the range between $S_{min}$ and $S_{max}$, the temperature of the supply air is controlled only by means of the recirculation valve 11. The linear control of the motor-adjustable louvers 56 is specified according to the curve 64, shown dashed in FIG. 6d, and that of the louvers 59 and 60 according to the curve 65, shown with continuous lines in FIG. 6d. Using these fuzzy sets, the air conditioning system 16 can be operated in an optimum fashion as a function of the circumstances, which is not possible with conventional air-conditioning control.

The air flow of the supply air and of the discharge air can also be taken into account, if the air discharge duct 6 is equipped with a sensor for measuring the air flow velocity, in addition to the sensors 28 (cf. FIG. 1). Using this, the capacity of the blower 23 can be set to the absolute minimum necessary in order to ensure the required air exchange. As is known, in the case of too low a throughput of air in the air-conditioned room 1, the air in the room is too severely heated by the waste heat from the textile machines in their direct vicinity, so that locally considerable differences can be produced in the temperature and in the relative air humidity, which have a negative effect on the operation of the textile machines. Using this sensor, the air flow in the air-conditioned room 1 can be registered via the discharge air, and thus the various manipulated variables of the air conditioning system 16 can be Set in an optimum fashion by the control in accordance with a further fuzzy set (not shown here), using the process computer 26. Furthermore, reverse flow of the machine discharge air into the air-conditioned room 1 via the air discharge duct 6 can be prevented.

Furthermore, a maximum value of dust and lint loading of the air in the room must not be exceeded, on the basis of health regulations. The sensors 28 in FIG. 1 can therefore also be supplemented with a sensor for measuring the dust content, which are used for controlling the minimum throughput of air on the basis of the measured dust loading of the air in the room. Such a commercially-available sensor is based, for example, on the principle of a laser light barrier, and can additionally allow the filter capacity of the filter unit 16 to be controlled and monitored via the process computer 26. The signal lines to the process computer 26 are in this case designed identically as for the sensors 28 for the temperature and for the relative humidity. The control is then designed in such a way that the rotational speed of the fan of the blower 9 between the filter unit 8 and the recirculation valve 11 is controlled by the process computer on the basis of the value of the dust content measured in the air discharge duct 6.

As a further supplement, a differential pressure sensor 70 can be provided in the air-conditioned room 1 (cf. FIG. 1), which sensor registers the difference between the pressure in the air-conditioned room 1 and the external pressure. An air flow sensor is preferably used as the differential pressure sensor 70. The signal lines are once more identically designed and are connected to the process computer 26 as in the case of the sensors 28. The rotational speed of the fan in the blower 23 is then changed, using a so-called "master/slave" control loop, in proportion to the rotational speed of the blower 9, to be specific in such a way that the pressure in the air-conditioned room 1 is kept equal to the external pressure. This avoids the situation that, when doors are opened to the outside, an air balance flow is produced, which disturbs the overall functioning of the air conditioning system 16. Instead of the above mentioned rotational speed control, the control of the blower capacity can also be carried out via a throttling valve which is adjusted at constant rotational speed.

In a further embodiment, sensors 72 can also be provided for measuring the electrical power or effective power consumed by all the textile machines 2 and 3 located in the air-conditioned room 1 (cf. FIG. 1), said sensors, as in the case of the differential pressure sensor 70, are likewise connected via signal lines to the process computer 26, and whose measured signals have an influence on the control of the air conditioning system 16 in the manner described above. If appropriate, this can also already take place using a single common sensor 72 in the electrical feed to all the textile machines 2 and 3. These commercially available sensors 72 for measuring the electrical effective power function on the basis of a watt-metric measurement. The dust content and/or the differential pressure and/or the electrical power consumed can also be taken into account in the process computer 26 for controlling the air conditioning system 16, in accordance with a respective predetermined fuzzy set.

It is obvious for those skilled in control technology that, although the control described above in the process computer 26, using a cascade circuit of room air controller 31 and supply air controller 32, is very advantageous for stable control, it is also possible to use control without cascade control using processors which operate only on the basis of the fundamentals of the fuzzy logic mentioned above. In such a case, the sensors 27, 28 and if appropriate 29 can be fed directly to a process computer 26 operating in this manner. The sensors 27, 28 and if appropriate 29 then exert their influence on the manipulated variables via the usual means of fuzzy control. The usual means are integration, amplification, differentiation over time, allocation function over time (fuzzy set) and the like.

The device described above for air-conditioning control, in the various embodiments, is very well suited for use in existing air conditioning systems, that is to say it essentially needs only to have the sensors 27 and 28 (and if appropriate the sensors 29, 70 and 72) installed at the correct location and the normal process controller exchanged for the new process computer 26 having the cascade controls. As a result, this device saves a considerable ventilation capacity of the blower 23, which is directly reflected in the production costs of a spinning mill. Furthermore, room air-conditioning having a reduced air flow and optimum setting of the temperature and of the relative humidity furnishes an improved capacity of the textile machines with significantly less thread breaks, above all in the starting and doffing phases. The improved operating climate likewise has an effect on the operating personnel, which can contribute to a further improvement in quality of the yarn products.

I claim:

1. A device for high-dynamic air-conditioning control of temperature and relative humidity in an air-conditioned room (1) having textile machines, comprising:

(a) an air discharge duct (6) and an air supply duct (5) which connect the air-conditioned room (1) to an air conditioning system (16);

(b) a regulating device (26) including a first set of sensors (28) for measuring the actual value of the room temperature and the relative humidity of the room air (R-Ist), which sensors are operatively connected to at least one control loop of the air conditioning system (16), wherein the first set of sensors (28) is in controlling communication with a first control loop (31);

(c) a second set of sensors (27) for measuring the actual value of the temperature and relative humidity of the supply air (Z-Ist) in the air supply duct (5), wherein the second set of sensors (27) is in controlling communication with a second control loop (32);

(d) the first control loop (31) and the second control loop (32) being connected in cascade, wherein the first control loop (31) delivers a desired value for the supply air (Z-Soll) to the second control loop (32) on a basis of the actual value of the room air (R-Ist) and a predetermined desired value of the room air (R-Soll), and wherein the second control loop (32) delivers a control variable for controlling air-conditioning elements (17, 18, 19, 20, 22) operable for adjusting the temperature and relative humidity of the air-conditioned room (1) on a basis of the desired value for the supply air (Z-Soll) and the actual value of the temperature and the relative humidity of the supply air (Z-Ist).

2. The device as claimed in claim 1, wherein the first and second sets of sensors (28, 27) for measuring the temperature are connected to a first cascade control means, and the first and second sets of sensors (28, 27) for measuring the relative humidity connected to a second cascade control means, the first and the second cascade control means being operatively independent of each other.

3. The device as claimed in claim 1 or 2, wherein the air discharge duct (6) includes a mixing unit (11) comprising a motor-adjustable recirculation air valve connected to an external air duct (13) on which sensors (29) for measuring the temperature and the relative humidity are arranged, said sensors (29) and said mixing unit (11) connected for control purposes to the second control loop (32).

4. The device as claimed in claim 1, wherein the control loops (31, 32) are constructed as integral controllers.

5. The device as claimed in claim 1, wherein the control loops (31, 32) are constructed as proportional "+" integral controllers.

6. The device as claimed claim 1, wherein the sensors (27) for measuring the temperature and the relative humidity of the air in the room are positioned in the air discharge duct (6) of the air-conditioned room (1).

7. The device as claimed in claim 1, wherein the sensors (27, 28, 29) for measuring the temperature are sensors having resistor means selected from a group consisting of a semiconductor resistor and a resistance wire.

8. The device as claimed claim 1, wherein the sensors (27, 28, 29) for measuring the relative humidity include measurement means selected from the group consisting of capacitor means or resistor measurement means.

9. The device as claimed in claim 1, wherein an air flow velocity sensor is provided for measuring the air flow velocity in the air discharge duct (6) of the air-conditioned room (1), said air flow sensor being connected to a rotational speed control means of a blower (23) in order to control the throughput of air.

10. The device as claimed in claim 9, wherein a dust content sensor is provided for measuring the dust content in the air discharge duct (6) of the air-conditioned room (1), the measured values of said dust content sensor being intended to prescribe a minimum value for the throughput of air.

11. The device as claimed in claim 1, wherein there is provided in the air-conditioned room (1) a differential pressure sensor (70) which is connected to a control means of at least two blowers (9, 23) in order to control the pressure balance.

12. The device as claimed in claim 1, characterized in that in the electrical feed to the textile machines (2, 3) in the air-conditioned room (1) there is provided at least one power consumption sensor (72) for registering the electrical power consumed, said sensor being connected to a process computer (26).

13. The device as claimed in claim 1, wherein the control loops (31, 32) operate in accordance with predetermined fuzzy sets for the temperature, for the relative humidity and if appropriate for the throughput of air and/or the differential pressure and/or the electrical power consumed.

14. A device for high-dynamic air-conditioning control of temperature and relative humidity in an air-conditioned room (1) having textile machines, comprising:
   (a) an air discharge duct (6) and an air supply duct (5) which connect the air-conditioned room (1) to an air conditioning system (16);
   (b) sensors for measuring the temperature and the relative humidity of the air, which sensors are operatively connected to at least one control loop of the air conditioning system (16), wherein the sensors are connected for control purposes to a process computer (26) which has at least one control loop (31, 32), operating in accordance with predetermined fuzzy sets, and operatively connected to air-conditioning control elements for control of temperature and relative humidity; and
   (c) at least one of said sensors communicating with said air supply duct (5) downstream of said control elements for measuring the temperature and the relative humidity of air supplied to the air conditioned room (1), and said at least one sensor communicating these measured values to said at least one control loop (31, 32), wherein said at least one control loop (31, 32) directs said control elements to accurately maintain the temperature and the relative humidity of the air-conditioned room (1) within a narrow bandwidth.

15. The device as claimed in claim 14, wherein a dust content sensor is provided for measuring the dust content in the air discharge duct (6), said dust content sensor being connected for control purposes to the process computer (26), which has at least one control loop (31, 32), operating in accordance with a predetermined fuzzy set, for the throughput of air.

16. The device as claimed in claim 14 or 15, wherein a differential pressure sensor (70) is provided for measuring the differential pressure in the air-conditioned room (1), said differential pressure sensor being connected for control purposes to the process computer (26), which has at least one control loop (31, 32), operating in accordance with a predetermined fuzzy set for controlling differential pressure.

17. The device as claimed in claim 14, wherein at least one power consumption sensor (72) is provided for measuring the electrical power consumed by the textile machines (2, 3), said power consumption sensor being connected for control purposes to the process computer (26), which has at least one control loop (31, 32), operating in accordance with a predetermined fuzzy set, for the electrical power consumed.

18. A method for high-dynamic air-conditioning control of temperature and relative humidity in an air-conditioned room (1) having textile machines, comprising the steps of:
   (a) directing the discharge air into an air-conditioning system (16) wherein the air is reconditioned and fed as supply air to the air-conditioned room (1);
   (b) measuring the temperature and the relative humidity of the air in the room;
   (c) inputting these values to a first control loop (31), in which a set point for the temperature and a set point for the relative humidity of the supply air are determined on the basis of prescribed desired values;
   (d) inputting said temperature and relative humidity set points together with measured values for the temperature and for the relative humidity of the supply air to a second control loop (32), on the basis of which the control elements of the air conditioning system (16) are set, the temperature and relative humidity of the supply air being measured downstream of the control elements, such that the temperature and relative humidity of the air conditioned room (1) are accurately maintained within a narrow bandwidth.

19. The method as claimed in claim 18, wherein the control elements of the air conditioning system (16) relating to the temperature and relative humidity are set via separate controllers.

20. The method as claimed in claim 18, and including the step of controlling the air flow velocity of the discharge air from the air-conditioned room (1) and the throughput of air in the air conditioning system (16) is controlled on the basis of measured values of the air flow velocity and throughput of air in the air conditioning system.

21. The method as claimed in claim 18, including the step of measuring the dust content of the discharge air from the air-conditioned room (1) and defining a minimum value for the control of the throughput of air on the basis of the measured value of the dust content.

22. The method as claimed in claim 18, and including the step of measuring the differential pressure between the pressure in the air-conditioned room (1) and the external pressure, and controlling the air flow in the air conditioning system (16) by means of blowers (9, 23) in such a way that the pressure in the air-conditioned room (1) is kept equal to the external pressure.

23. The method as claimed in claim 18, and including the step of measuring the electrical power consumed by the textile machines (2, 3) in the air-conditioned room (1) and controlling the temperature, relative humidity and the throughput of air in the air-conditioned room (1) on the basis of these measured values.

24. The method as claimed in claim 18, wherein the temperature, the relative humidity and if appropriate the throughput of air are controlled on the basis of predetermined fuzzy sets.

25. A method for high-dynamic air-conditioning control of temperature and relative humidity in an air-conditioned room (1) having textile machines, comprising the steps of:

(a) directing discharge air into an air conditioning system (16), reconditioning the air in the air conditioning system and feeding supply air to the air-conditioned room (1), wherein the temperature and the relative humidity of the air in the room are measured, and these values communicated to a process computer (26) operatively connected to air-conditioning control elements; and (b) measuring the temperature and the relative humidity of the supply air downstream of the control elements and communicating these measured values to the process computer, wherein the air conditioning system (16) is controlled on the basis of predetermined fuzzy sets for the temperature and the relative humidity, such that the temperature and the relative humidity of the air conditioned room (1) are accurately maintained within a narrow bandwidth.

26. The method as claimed in claim 25, and including the step of measuring the air flow velocity of the discharge air from the air-conditioned room (1) and controlling the throughput of air in the air conditioning system (16) on the basis of these measured values, in accordance with a predetermined fuzzy set.

27. The method as claimed in claim 25, and including the step of measuring the differential pressure between the pressure in the air-conditioned room (1) and the external pressure and controlling the air flow in the air conditioning system (16) by means of blowers (9; 23), in accordance with a predetermined fuzzy set, in such a way that the pressure in the air-conditioned room (1) is kept equal to the external pressure.

28. The method as claimed in claim 25, and including the steps of measuring the dust content of the discharge air from the air-conditioned room (1), defining a minimum value for the throughput of air on the basis of these measured values, and controlling the throughput of air on the basis of this minimum value in accordance with a predetermined fuzzy set.

29. The method as claimed in claim 25, and including the step of measuring the electrical power consumed by the textile machines (2, 3) in the air-conditioned room (1) and controlling the temperature, the relative humidity and the throughput of air in the air-conditioned room (1) on the basis of these measured values in accordance with a predetermined fuzzy set.

* * * * *